United States Patent [19]
Jonda

[11] 4,092,453
[45] May 30, 1978

[54] LIGHTWEIGHT STRUCTURAL PART FORMED OF CARBON FIBER-REINFORCED PLASTIC

[75] Inventor: Wolfgang Jonda, Oberpframmern, Germany

[73] Assignee: Messerschmitt-Bolkow-Blohm GmbH, Munich, Germany

[21] Appl. No.: 639,927

[22] Filed: Dec. 11, 1975

[30] Foreign Application Priority Data

Dec. 21, 1974 Germany ............................ 2460807

[51] Int. Cl.² .................................................. B32B 7/00
[52] U.S. Cl. ..................................... 428/255; 156/184; 156/189; 343/897; 428/260; 428/408; 428/902
[58] Field of Search ............... 156/170, 184, 189, 193, 156/194, 242, 243, 245, 174; 428/408, 105, 107, 113, 251, 273, 902, 260, 257, 421, 228, 229, 245, 255; 343/897; 139/420 R

[56] References Cited

U.S. PATENT DOCUMENTS

| | | | |
|---|---|---|---|
| 2,779,702 | 1/1957 | Wilson et al. | 139/420 R |
| 3,367,812 | 2/1968 | Watts | 156/170 |
| 3,700,535 | 10/1972 | McCoy et al. | 428/408 |
| 3,914,494 | 10/1975 | Park | 428/902 |

*Primary Examiner*—James J. Bell
*Attorney, Agent, or Firm*—Toren, McGeady and Stanger

[57] ABSTRACT

A lightweight structural part is formed of band-shaped fiber strands woven into a lattice-type structure. Each fiber strand is made up of a number of carbon fiber rovings impregnated with a synthetic resin. The rovings in each strand are arranged in at least two layers with a plurality of rovings in each layer. The fiber strands are disposed in spaced relation in the lattice-type structure and are woven in a repetitive pattern. In forming a structural part or a support, the lattice-type structure can be cut into sectors or other shapes with the shapes being joined together, if necessary, to provide the desired finished configuration.

11 Claims, 8 Drawing Figures

U.S.Patent    May 30, 1978    4,092,453

LIGHTWEIGHT STRUCTURAL PART FORMED OF CARBON FIBER-REINFORCED PLASTIC

SUMMARY OF THE INVENTION

The present invention is directed to a lightweight structural part formed of carbon fiber-reinforced plastic which is constructed from carbon fiber rovings wound on a mandrel and subsequently processed by pressing.

Carbon-fiber-reinforced plastics are used for structural parts which must have a high rigidity and a very low specific weight. Further, for many applications an extremely low coefficient of thermal expansion is also required. In the production of carbon fiber-reinforced plastics by winding yarn or rovings, it is known to carry out the winding of the yarn or rovings in uniform layers staggered by 90°. To obtain a symmetrical structure of sufficient strength and also to prevent delamination, a laminate of four crossing layers is required, because the delamination particularly under alternating stresses cannot be prevented if only two layers are employed. In the further processing of the laminate, it is known to remove the finished wound laminate from the winding mandrel before it is hardened, to cut it into the desired parts, and then to harden the parts in molds. However, forming high strength carbon fibers into mats is generally not possible, because of their brittleness.

The present invention is directed to the problem of providing lightweight structural parts of carbon fiber-reinforced plastic with improved properties over what has been used in the past.

Therefore, in accordance with the present invention, the problem is solved by providing a planar lightweight structural part formed in a lattice-type arrangement of band-shaped fiber strands each made up of several rovings or lengths of yarn with the crossing fiber strands arranged in a woven-type structure.

In another feature of the invention, each fiber strand consists of two layers of three lengths of yarn or rovings each or a different number of layers are provided in the fiber strands of the lightweight part of a different number of lengths of yarn or rovings are used per layer of fiber strands.

In accordance with the invention, it is suggested that the woven-type structure of the fiber strands be ordered in a two-dimensionally defined recurring pattern that is, in a lattice-type arrangement with adjacent strands extending in the same direction disposed in spaced relation so that the crossing strands form a repetitive pattern of four-sided openings across the entire woven-type structure.

The essential advantage of the invention is that the wound laminate does not consist of complete laminar layers, rather the individual lengths of yarn or rovings are wound into bandshaped strands and the strands are disposed in spaced relation to one another in both directions of the woven-type structure. As a result, an effective wall thickness is obtained, due to the material used for a certain area, which, as in a perforated sheet, is considerably reduced as compared to a structure of an equal number of layers with the individual windings disposed in side-by-side relation. The interwoven arrangement of the fiber strands has the effect that, considered over a larger area, a symmetrical and planar part of great strength is obtained. Moreover, delamination is effectively prevented by the structure of the laminate formed in accordance with the invention even under the effect of high alternating stresses and at considerable temperature differences.

The physical properties of the structural parts are favorably influenced by the disposition of the fiber strands in a two-dimensionally defined pattern which, similar to a woven fabric, displays regularly or irregularly displaced strand junctions. Because of the lattice-type structure of the wound laminate with the spacing between adjacent fiber strands, the intersections of the fiber strands can also be used in carbon fibers of the high-strength type, which would break when woven in a weft and warped arrangement, because of the fiber's brittleness.

In highly stressed parts, the total strength of the lightweight structural part formed as a laminate can be considerably increased with less material by winding the laminate with a partially greater number of layers per fiber strand and with a partially greater number of lengths of the yarn or rovings per layer.

The structure of the fiber material according to the present invention with the fiber strands being wound permits a simple control of the fiber orientation, both during the winding step and during the subsequent processing of the wound woven structure into a finished lightweight part.

In the application of the invention, the lightweight structural part can be used as a one-sided cover or as a primary element of a structural part or as the outer layers of a sandwich-type panel. Further, the structural part can be used in forming parts with a double-spherical curvature, for instance, for use in forming antenna mirrors and their supporting structure.

Preferred applications of the lightweight structural parts according to the present invention are in aviation and space travel to afford further weight savings as compared to presently known materials. In aviation, the structural parts can be used in wing drop indicators, floor constructions and antennas built into radomes. In antennas, a substantial weight reduction can be achieved, as compared to conventional constructions, by making both the antenna mirrors and the supporting structure from the lightweight parts formed in accordance with the present invention. These extremely lightweight antennas can be rotated practically without inertia, so that considerably improved antenna function can be achieved. In space travel applications, the lightweight structural parts can be used in the construction of entire satellite bodies as well as supporting plates for solar cells. Furthermore, the structural parts can be used in sandwich panel constructions as the covering layers of the panels. In space travel applications, the extremely low coefficient of thermal expansion of carbon fiber-reinforced plastic is of particular advantage.

The various features of novelty which characterize this invention are pointed out with particularity in the claims annexed to and forming a part of this disclosure. For a better understanding of the invention, its operating advantages and specific objects attained by its use, reference should be has to the accompanying drawings and descriptive matter in which there are illustrated and described preferred embodiments of the invention.

DETAILED DESCRIPTION OF THE INVENTION

Figure 1:
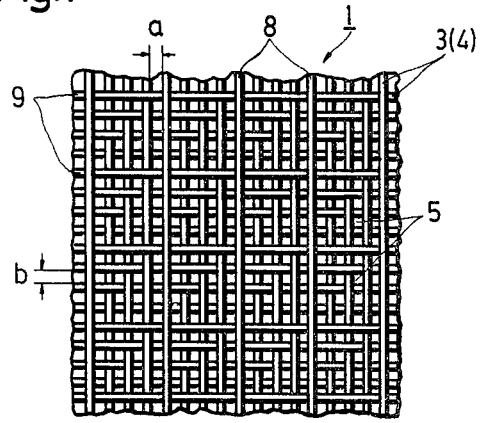
FIG. 1 is a plan view of a portion of a lightweight structural part formed in accordance with the present invention.

In FIG. 1 a portion of a planar or flat lightweight structural part 1 formed in accordance with the present invention, is shown, and is made of a wound laminate of carbon fiber-reinforced plastic. During the winding process, not shown, the rovings which consist of a great number of carbon fibers, are first impregnated with a synthetic resin and then, by constantly moving a winding head back and forth, they are applied in a given pattern in two crossing or intersecting fiber directions on a rotating winding mandrel forming a lattice-type arrangement. Before the laminate on the mandrel is hardened it is cut in the direction of the fibers according to the dimension of the part to be formed and then it is shaped to correspond to the contours of the finished part and finally hardened.

Figure 2:
FIG. 2 is a cross-sectional view, greatly enlarged of a fiber stand used in forming the structural part shown in FIG. 1.
Figure 3:
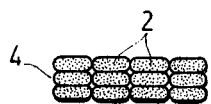
FIG. 3 is a cross-sectional view, similar to FIG. 2, of another embodiment of a fiber strand used in forming the structural part.

In the lightweight structural part 1, as shown in FIGS. 2 and 3, the rovings 2 are wound into fiber strands 3 (FIG. 2) or 4 (FIG. 3) and the strands as viewed in FIG. 1 are spaced apart by a horizontal dimension $a$ and a vertical dimension $b$ with the spacing dimensions being in accordance with the strength and other requirements of the part to be formed. Usually, the dimensions $a$ and $b$ are equal, but different spacing dimensions can be used. Fiber strand 3 is composed of two layers of rovings with three rovings in each layer. Fiber strand 4 has three layers of roving with four rovings in each layer so that by using such a fiber strand a stronger and stiffer lightweight part 1 can be obtained. In accordance with the invention, the fiber strands can be arranged in any desired variation of layers and number of rovings per layer, even single-layer fiber strands can be used for lightweight structural parts which are not too highly stressed.

In the lightweight structural part 1 shown in FIG. 1, a number of repetitive woven-type patterns are shown with each pattern containing four fiber strands 3 or 4 in the horizontal and vertical directions. The repetitive patterns 5 shown in FIG. 1 with the strands crossing one another at different levels, yields a very firm bond of the individual fiber strands with one another and, as a result, a structural part is obtained which is rigid in all load directions. In the illustrated pattern 5, the fiber strands 3 or 4 are wound so that the last wound fiber strands 8 pass over the previously wound transversely extending fiber strands 9. This arrangement is repeated four times corresponding to the design of pattern 5 until a new pattern is commenced with the fiber strands 8, 9. Due to the small repetitive pattern 5, the lightweight structural part 1 gives the impression of a symmetrical flat structure. However, the invention is not limited to the illustrated pattern 5, any other pattern meeting the requirements of the part to be formed can be used with advantage. As illustrated in FIG. 1, the lattice-like arrangement of the crossing fiber strands forms four-sided openings.

Figure 4:
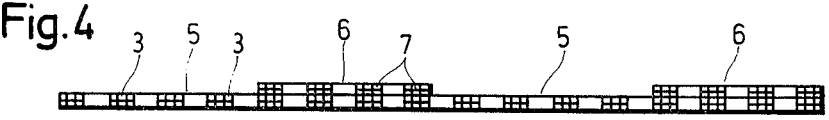
FIG. 4 is an enlarged side elevational view of a lightweight structural part formed from differently constructed fiber strands.

As shown in FIG. 4, individual wound sections can be made with patterns 6 and reinforced fiber strands 7, with the adjoining wound sections being composed of patterns 5 as shown in FIG. 1, made up of fiber strands 3. In this arrangement, the reinforced sections or patterns 6 act as reinforcing ribs in the lightweight structural part 1 and provide a substantially higher strength with relatively little additional material being used.

Figure 5:
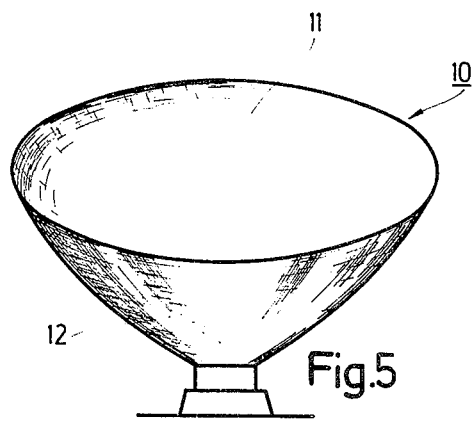
FIG. 5 is a perspective view of an antenna with its supporting frame.

In FIG. 5 an antenna body 10 is shown with both the antenna mirror 11 and its support 12 constructed from the lightweight structural parts 1, which are produced by pressing and hardening the wound laminate in a spherical mold.

Figure 6:
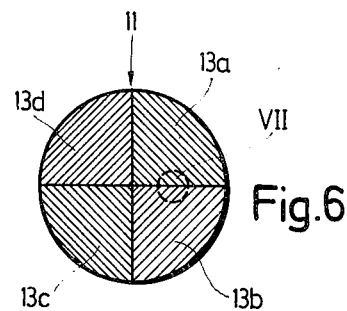
FIG. 6 is a top view of the antenna shown in FIG. 5.
Figure 8:
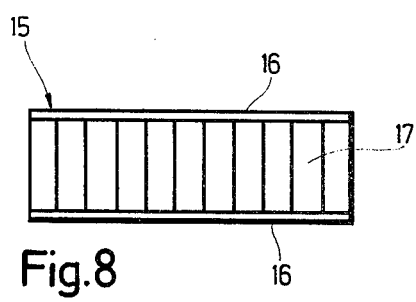
FIG. 8 is a side view of a sandwich panel construction.
Figure 7:
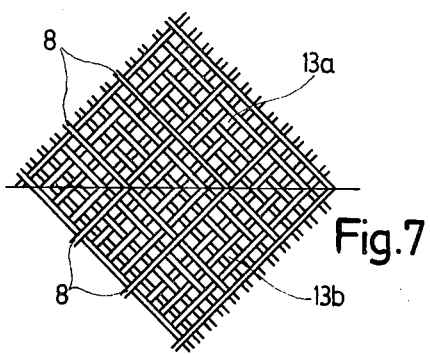
FIG. 7 is an enlarged detail view of the portion of FIG. 6 designated by VII.

In FIGS. 6 and 7, four equal sector-shaped parts 13a–13d are shown cut from the wound laminate structural part 1 for the production of the antenna mirror. The parts are cut so that the fiber strands 8 defining the patterns in the part and located on the top layer of the part during the winding, adjoin each other in an angle of about 90°, that is, fiber strands 8 in sector-shaped part 13a abut the corresponding fiber strands 8 in sector-shaped part 13b along the junction line beteen the two, note the encircled portion in FIG. 6 designated VII and the enlarged detail view of this portion of FIG. 6 shown in FIG. 7. In this arrangement of the lightweight structural parts, the transverse thermal expansion of the individual sectors 13a–13d caused by the plastic is compensated so that the coefficient of thermal expansion becomes zero for the entire antenna mirror. This characteristic is particularly important in space travel applications, because of the temperature changes between 120° C and −160° C can occur within a period of about 72 minutes as a result of rapidly changing solar radiation and the shadowing by the earth. To ensure the physical properties of the antenna mirror, the sectors 13a–13d overlap by about the width of a pattern 5. It is within the framework of the invention to provide, instead of four sectors 13a–13d, any other number of sectors for the antenna mirror 11. Another possible application of the present invention is as a sandwich panel 15 as shown in FIG. 8 where the covering layers 16 are formed of lightweight parts 1. Extending between and contacting the covering parts is a supporting body 17 which consists in a known manner of a honeycomb structure.

The carbon fiber strands may be of a standard quality, for example of fiber yarn Thornel 75S, marketed by United Carbon Corporation. The impregnating resin, for example, consist of 100 parts of a synthetic resin known in the trade as CY 209 (manufactured by Ciba-Geigy, Basel, Switzerland) and 25 parts of a hardener known as HT 972 (also marketed by Ciba-Geigy). Other carbon fiber of usual quality and other resin, e.h., based on epoxy, polyester or polyimid resin are usable.

What is claimed is:

1. A lightweight structural part comprising carbon fiber rovings impregnated with synthetic resin, said rovings wound into a laminated structure with the laminated wound structure subsequently being molded, wherein the improvement comprises that said laminated structure comprises a plurality of band-shaped fiber strands each containing a plurality of carbon fiber rovings and wound into a lattice-type structure, each said fiber strand comprising a plurality of rovings, said lattice-type structure including a first group of fiber strands and a second group of fiber strands with the fiber strands of each of said first and second groups being disposed in spaced relationship and said first group of fiber strands extending transversely of said second group of fiber strands with said fiber strands of said first and second groups forming a woven-type repetitive pattern of limited area.

2. A lightweight structural part, as set forth in claim 1, wherein said first group of fiber strands comprise a different number of layers of said rovings than said second fiber strands.

3. A lightweight structural part, as set forth in claim 2, wherein said first group of fiber strands have a different number of rovings per layer than said second group fiber strands.

4. A lightweight structural part, as set forth in claim 1, wherein said lattice-type structure is formed as a first planar section and a second planar section disposed in spaced substantially parallel relationship to one another, and a supporting body in contact with and extending between said first and second planar sections.

5. A lightweight structural part, as set forth in claim 1, wherein said lattice-type structure is shaped and hardened into a double-spherical curvature for forming an antenna mirror and the support for the antenna mirror.

6. A lightweight structural part, as set forth in claim 1, wherein said lattice-type structure is cut into a plurality of similarly shaped sector-shaped parts with each said sector-shaped part having a pair of radially extending sides joined together at one end of each side and an arcuately-shaped side connecting the other ends of said radially extending sides, and said sector-shaped parts joined together along the radially sides thereof with the one end of each of said radially extending sides meeting at a common point.

7. A lightweight structural part, as set forth in claim 6, wherein said first group of fiber strands in each said sector-shaped part is disposed perpendicularly to said first group of said fiber strands in the abutting said sector-shaped parts.

8. A lightweight structural part, as set forth in claim 7, wherein each said fiber strands of said first group in each said sector-shaped part are disposed in overlapping relationship along the adjacent radially extending sides of said sector-shaped parts.

9. A lightweight structural part, as set forth in claim 1, wherein said structural part having a width dimension and a length dimension, said first group of fiber strand consists of a plurality of first strands, second strands, third strands, and fourth strands, said second group of fiber strands consists of a plurality of fifth strands, sixth strands, seventh strands, and eighth strands, said strands in said first group and said second group of fiber strands being serially woven in a repetitive pattern in the width and length dimensions of said structural part with one said first strand being followed in spaced parallel relation by one said second strand, one said third strand and one said fourth strand and then with the arrangement of said first to fourth strands being repeated continuously in one dimension of the length and width dimensions of the structural part, said fifth strand extending transversely of said first group of fiber strands and passing over each of the first, second, third and fourth fiber strands, said sixth fiber strands extending parallel with said fifth fiber strand and passing over only three of said first, second, third, and fourth fiber strands, said seventh fiber strand extending parallel with said fifth and sixth fiber strands and passing over only two of said first, second, third and fourth fiber strands, and said eighth fiber strand extending parallel with said fifth, sixth and seventh fiber strands and passing over only one of said first, second, third and fourth fiber strands.

10. A lightweight structural part, as set forth in claim 9 wherein rectangularly shaped four-sided openings are formed between adjacent crossing strands of said first and second groups of strands.

11. A lightweight structural part, as set forth in claim 1, wherein the spacing between said fiber strands in said first group and said fiber strands in said second group is substantially the same.

* * * * *